United States Patent [19]
Tiao

[11] Patent Number: 5,176,167
[45] Date of Patent: Jan. 5, 1993

[54] CONTROL VALVE

[76] Inventor: Su-Hua Tiao, No. 19-1, Lane 4, Ching Nien I Rd.,, Ling Ya Dist., Kaohsiung City, Taiwan

[21] Appl. No.: 880,503

[22] Filed: May 8, 1992

[51] Int. Cl.$^5$ .................... F16K 31/28; F16K 33/00
[52] U.S. Cl. .................... 137/423; 122/504; 137/341; 137/426; 137/428; 137/430; 137/572; 141/198; 222/56; 222/68; 251/65
[58] Field of Search .................... 122/13.2, 406.1, 504, 122/505; 126/362; 137/341, 399, 423, 425, 426, 428, 430, 433, 572; 222/56, 66, 68; 251/65; 141/35, 192, 198

[56] References Cited

U.S. PATENT DOCUMENTS

| | | | |
|---|---|---|---|
| 879,557 | 2/1908 | Ledoux | 137/397 |
| 1,548,298 | 8/1925 | Woodard | 137/426 |
| 2,691,386 | 10/1954 | Madison | 137/433 |
| 2,886,056 | 5/1959 | Ratliff | 137/428 |
| 3,186,598 | 6/1965 | Jonsson | 222/67 |
| 3,189,063 | 6/1965 | Lowe | 137/433 |
| 3,817,261 | 6/1974 | Rogge | 222/56 |
| 4,263,932 | 4/1981 | Laar et al. | 137/572 |
| 4,300,311 | 11/1981 | Marchant | 137/430 |
| 4,399,835 | 8/1983 | Holderith | 137/433 |
| 4,944,326 | 7/1990 | Hsieh | 137/433 |

Primary Examiner—George L. Walton
Attorney, Agent, or Firm—Ladas & Parry

[57] ABSTRACT

A control valve includes a vertical housing having an upper float chamber, a lower valve chamber, and a valve seat support which is provided between the float chamber and the valve chamber, defines a passage communicating the float chamber and the valve chamber and has a bottom valve seat above the valve chamber. An inlet conduit extends outwardly from the housing and has an inlet and an outlet communicated with the valve chamber. An outlet conduit extends outwardly from the housing and has an inlet communicated with the passage and an outlet. A shaft is movable vertically, is provided inside the housing and has a valve block mounted on a bottom end of the shaft. An upper and a lower stop are respectively fixed on the shaft. An upper and a lower float are respectively movably sleeved around the shaft between the upper and lower stops. A perforated partition is mounted inside the housing between the upper float and the lower float. A metal member is mounted on the upper float, and a magnetic member is mounted on an upper end of the housing.

5 Claims, 6 Drawing Sheets

CONTROL VALVE

BACKGROUND OF THE INVENTION

1. Field of the Invention

This invention relates to a control valve, more particularly to an improved control valve which is to be connected to a water tank for automatically controlling the supply of water into the water tank without electricity in order to maintain a predetermined minimum water level in the water tank.

2. Description of Related Art

Referring to FIG. 1, a water heater (W) has a first water tank (21) for receiving unboiled water and a second water tank (22) for heating unboiled water and supplying boiled water. The second water tank (22) has a heating element (23) mounted adjacent to a bottom thereof. A conduit (24) is connected to the first water tank (21) and the second water tank (23). A non-return valve (11) is mounted on the conduit (24) to control the flow direction of water from the first water tank (21) to the second water tank (22). A control valve (10) is mounted on the conduit (24) upstream from the non-return valve (11) to control the water transmission from the first water tank (21) to the second water tank (22). Generally, the control valve (10) is manually operated. The heating element (23) is overheated and is easily damaged when the water level in the second water tank (22) is below the level of the heating element (23) and water is not immediately transmitted from the first water tank (21) to the second water tank (22) by actuating the control valve (10) manually. In addition, the control valve (10) may be an electromagnetic valve which operates automatically to provide water immediately from the first water tank (21) to the second water tank (22) when the water level in the second water tank (22) is below the level of the heating element (23). Therefore, the heating element (23) is not easily damaged and has a long service life. The one drawback is that electricity is necessary for the electromagnetic valve.

SUMMARY OF THE INVENTION

Therefore, the objective of this invention is to provide an improved control valve which is to be connected to a water tank for automatically controlling the supply of water into the water tank without electricity in order to maintain a predetermined minimum water level in the water tank.

Accordingly, a control valve of this invention connected to a first water tank and a second water tank for controlling the water level of the second water tank includes a vertical housing. The vertical housing has an upper end, a lower end, a float chamber adjacent to the upper end, a valve chamber adjacent to the lower end, a valve seat support provided between the valve chamber and the float chamber and defining a passage communicating the float chamber and the valve chamber, and a valve seat provided on a bottom portion of the valve seat support and immediately above the valve chamber. An inlet conduit extends outwardly from the housing above the valve chamber and has an inlet connected to the first water tank and an outlet adjacent to and communicated with the valve chamber. An outlet conduit extends outwardly from the housing above the valve chamber and opposite to the inlet conduit. The outlet conduit has an inlet adjacent to and communicated with the passage and an outlet connected to the second water tank. A controlling means for closing and opening the passage includes a shaft movable vertically and provided in the float chamber. The shaft has a top end extending adjacent to the upper end of the housing and a bottom end extending into the valve chamber passing through the passage. A valve block is mounted on the bottom end of the shaft in order to abut against the valve seat so as to close the passage. An upper stop is fixed on the shaft adjacent to the top end of the shaft. A lower stop is fixed on the shaft between the upper stop and the bottom end of the shaft at a predetermined level. An upper float is movably sleeved around the shaft between the upper stop and the lower stop in order to push the shaft upward when the upper float abuts on the upper stop so as to cause the valve block to be abutted against the valve seat. A lower float is movably sleeved around the shaft between the upper stop and the lower stop and below the upper float in order to push the shaft downward when the lower float abuts on the lower stop so as to move the valve block away from the valve seat.

A means for limiting the downward movement of the upper float and the upward movement of the lower float is mounted on the housing between the upper float and the lower float. A holding means is mounted on the upper end of the housing for temporarily holding the upper float against the upper end of the housing in order to keep the valve block in a position which closes the passage when the upper float abuts on the upper stop and pushes the shaft upward and for releasing the upper float away from the upper end of the housing when the lower float abuts on the lower stop and pushes the shaft downward.

Therefore, the water level of the second tank can always be maintained at a controlled minimum level according to the predetermined level of the lower stop.

BRIEF DESCRIPTION OF THE DRAWING

Other features and advantages of the present invention will become apparent in the following detailed description of the preferred embodiments, with reference to the accompanying drawings, of which.

DETAILED DESCRIPTION OF THE INVENTION

Figure 1:
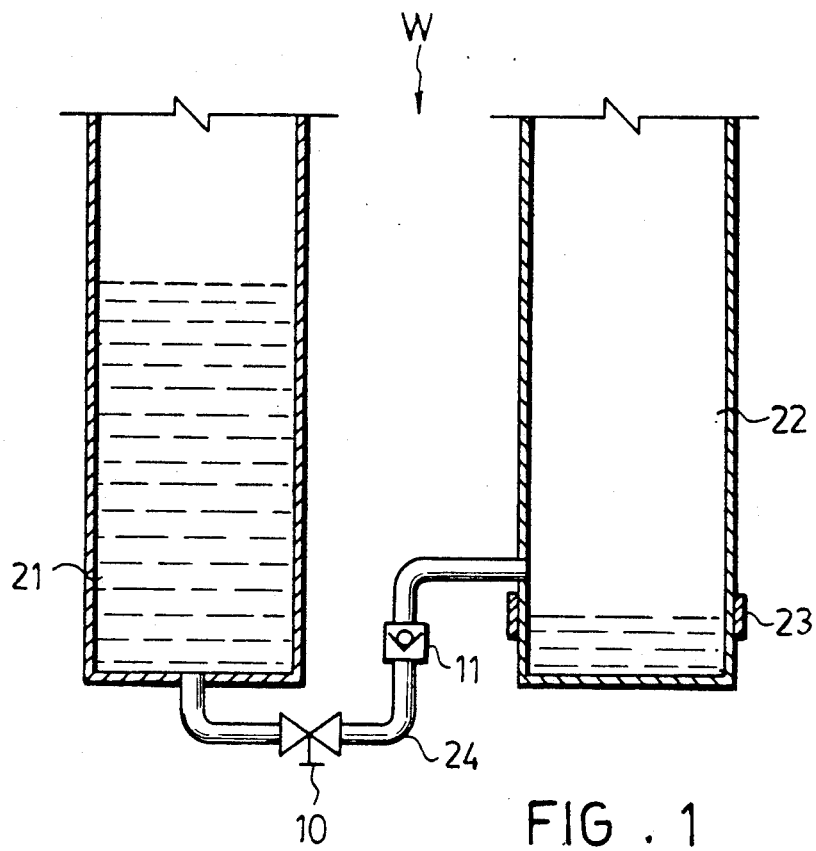
FIG. 1 is a schematic view of a water heater provided with a conventional control valve.
Figure 2:
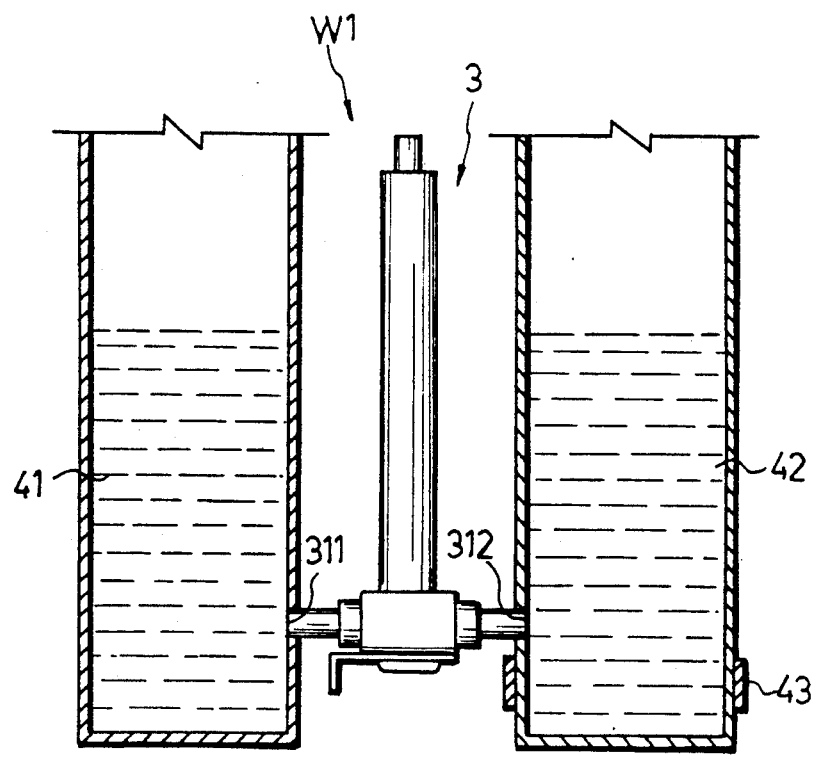
FIG. 2 is a schematic view of a water heater provided with an improved control valve of this invention.

Referring to FIG. 2, a control valve (3) of this invention for a water heater (W1) is connected to a first water tank (41), which receives unboiled water, and a second water tank (42), which heats unboiled water with a heating element (43) mounted inside the second water tank (42) and which supplies boiled water, in order to control automatically the supply of water from the first water tank (41) into the second water tank (42) without electricity so as to maintain a predetermined minimum water level in the second water tank (42).

Figure 3:
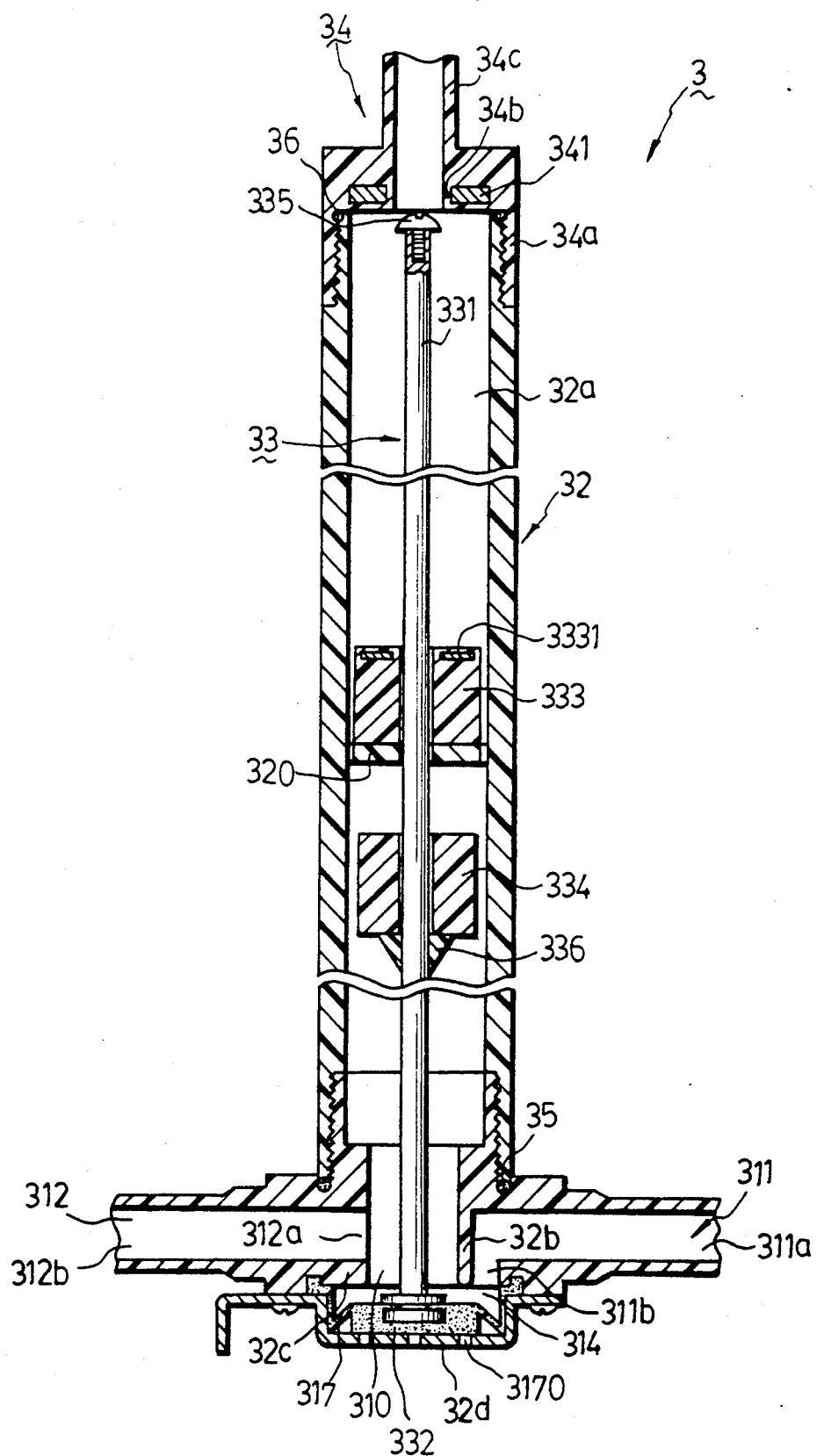
FIG. 3 is a sectional view of the control valve of this invention.

Referring to FIG. 3, the control valve (3) includes a vertical housing (32). The housing (32) has an upper end with an opening, a lower end, a float chamber (32a) adjacent to the upper end, a valve chamber (314) adjacent to the lower end, a valve seat support (32b) provided between the float chamber (32a) and the valve chamber (314) and defining a passage (310) communicating the float chamber (32a) and the valve chamber (314), and a valve seat (32c) provided on a bottom portion of the valve seat support (32b) and immediately above the valve chamber (314). The valve seat support (32b) is threadedly mounted to the float chamber (32a), and a waterproofing washer (35) is provided therebetween. An inlet conduit (311) extends outwardly from the housing (32) adjacent to the valve seat support (32b) and above the valve chamber (314). The inlet conduit (311) has an inlet (311a) connected to the first water tank (41) and an outlet (311b) adjacent to and communicated with the valve chamber (314). An outlet conduit (312) extends outwardly from the housing (32) adjacent to the valve seat support (32b), above the valve chamber (314) and opposite to the inlet conduit (311). The outlet conduit (312) has an inlet (312a) adjacent to and communicated with the passage (310) and an outlet (312b) connected to the second water tank (42). A tubular cover (34) includes a lower portion (34a) threadedly mounted on the upper end of the housing (32), an intermediate step portion (34b) connected to the lower portion (34a) and extending inwardly and a constricted upper portion (34c) with a top opening. A waterproofing (36) is provided between the cover (34) and the housing (32).

A controlling means (33) for closing and opening the passage (310) includes a shaft (331) movable vertically and provided in the float chamber (32a). The shaft (331) has a top end extending adjacent to the upper end of the housing (32) and a bottom end extending into the valve chamber (314) passing through the passage (310). A valve block (332) made of an elastic plastic material is mounted on the bottom end of the shaft (331) in order to abut against the valve seat (32c) so as to close the passage (310). An upper stop (335) in the form of a screw is threadedly fitted in the top end of the shaft (331). The upper stop (335) is threadedly adjustable in height with respect to the shaft (331). A lower stop (336) is fixed on the shaft (331) between the upper stop (335) and the bottom end of the shaft (331) at a predetermined level above the heating element (43) inside the second water tank (42). An upper float (333) is movably sleeved around the shaft (331) between the upper stop (335) and the lower stop (336) in order to push the shaft (331) upward when the upper float floats up and abuts on the upper stop (335) so as to cause the valve block (332) to abut against the valve seat (32c). A lower float (334) is movably sleeved around the shaft (331) between the upper stop (335) and the lower stop (336) and below the upper float (333) in order to push the shaft (331) downward when the lower float (334) moves downward and abuts on the lower stop (336) so as to move the valve block (332) away from the valve seat (32c).

A means for limiting the downward movement of the upper float (333) and the upward movement of the lower float (334) includes a perforated partition (320) mounted in the float chamber (32a) of the housing (32) between the upper float (333) and the lower float (334).

A holding means includes a pair of metal members (3331) such as iron members mounted on the upper float (333) and a pair of magnet members (341) mounted on the step portion (34b) of the cover (34) for temporarily holding the upper float (333) against the step portion (34b) of the cover (34) in order to keep the valve block (332) in a position which closes the passage (310) when the upper float (333) abuts on the upper stop (335) and pushes the shaft (331) upward and for releasing the upper float (333) away from the step portion (34b) of the cover (34) when the lower float (334) abuts on the lower stop (336) and pushes the shaft (331) downward.

The lower end of the housing (32) has a bottom cover (32d) adjacent to the valve chamber (314). The bottom cover (32d) is fixed to the inlet conduit (311) and the outlet conduit (312) by screws. A flexible sheet (317) is connected to the valve block (332) and the bottom cover (32d) and cooperates with the bottom cover to confine a volume variable air space (314a) in the valve chamber (314). The bottom cover (32d) is provided with a plurality of vents (3170) communicating the volume variable air space (314a).

Figure 4:
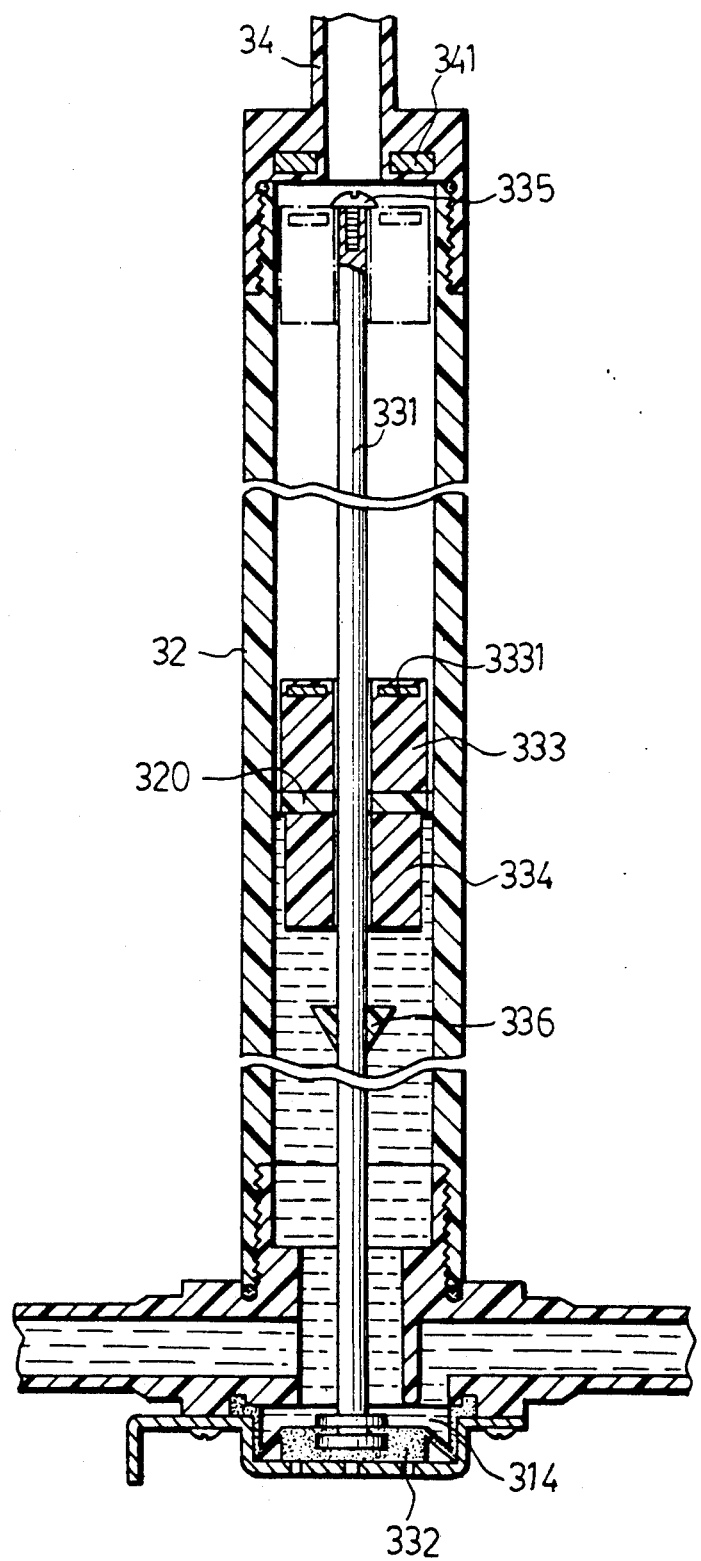
FIG. 4 shows that the upper float and the lower float float up when water flows into the float chamber of the control valve of this invention.
Figure 5:
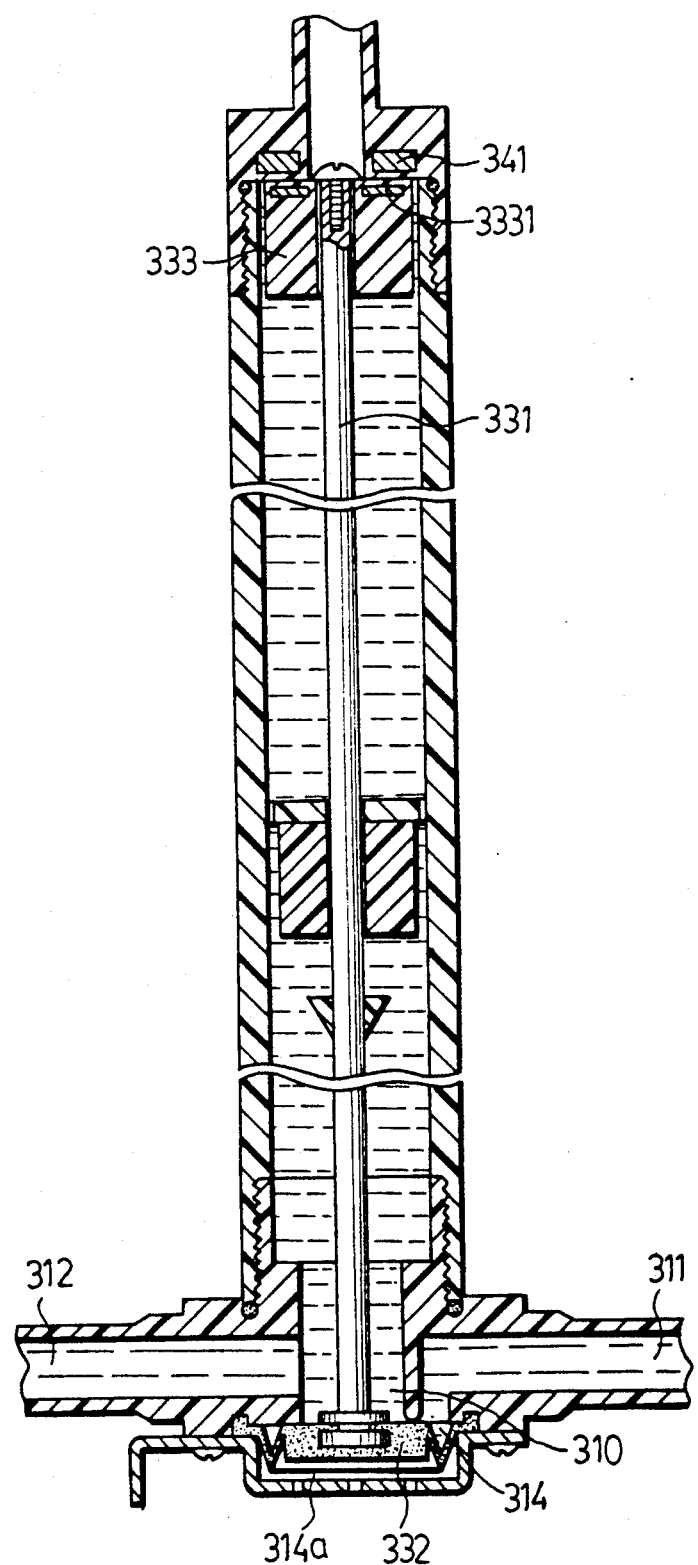
FIGS. 5 and 6 show that the upper float is held against the cover by the holding means and the valve block abuts against the valve seat.
Figure 6:
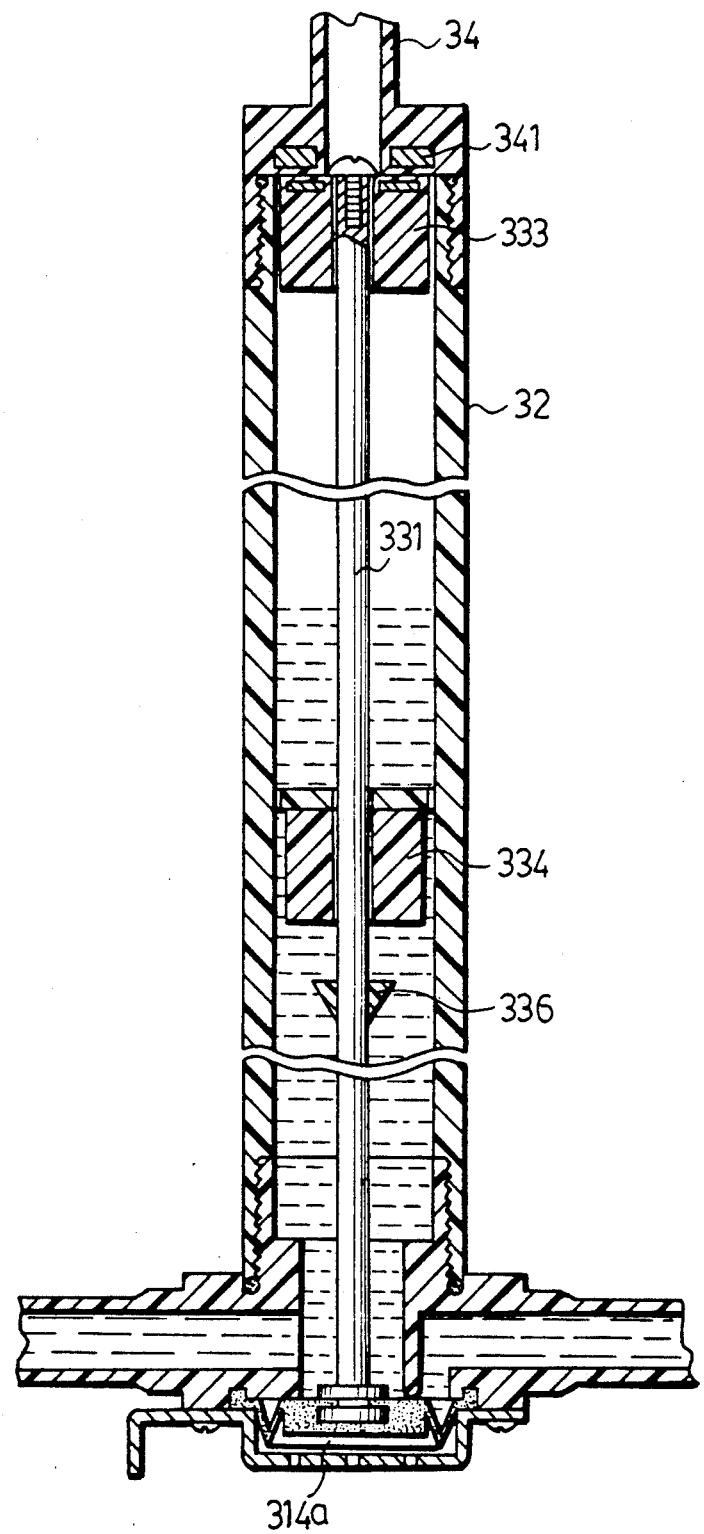
Figure 7:
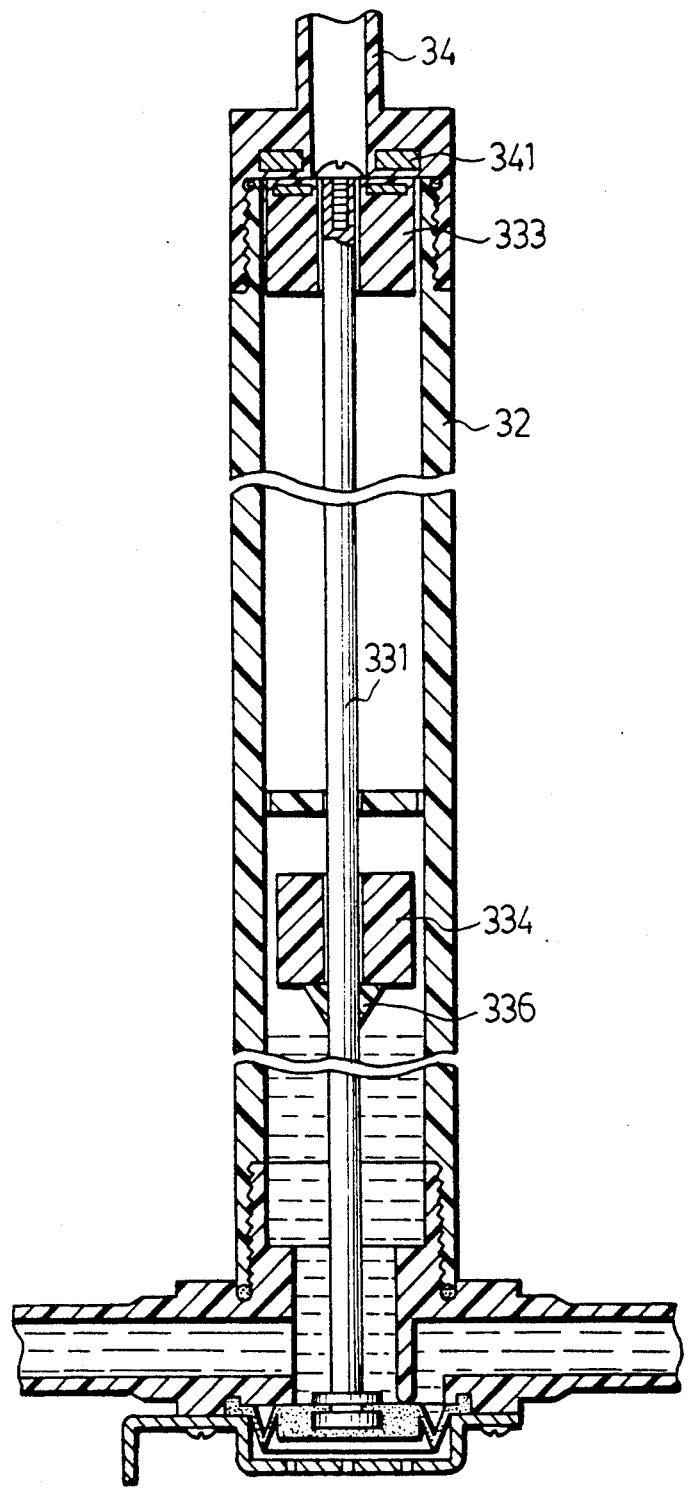
FIG. 7 shows that the lower float moves down and abuts on the lower stop.

Referring to FIGS. 4 and 5, unboiled water flows into the float chamber (32a) of the housing (32) and the second water tank (42) from the first water tank (41) through the valve chamber (314) and the passage (310). Since the float chamber (32a) and the second water tank (42) are always communicated as indicated by the arrow (I) in FIG. 5, they have equal water levels. The valve block (332) abuts against the valve seat (32c) so as to close the passage (310) when the upper float (333) gradually floats up, abuts on the upper stop (335), pushes the shaft (331) upward and is magnetically attracted on the step portion (34b) of the cover (34) by the holding means. The upper float (333) is maintained against the step portion (34b) of the cover (34) by means of the magnetic attraction of the holding means and the buoyant force of water. Therefore, the valve block (332) is maintained against the valve seat (32c). Thus, water from the first water tank (41) does not flow into the second water tank (42) again. Referring to FIGS. 6 and 7, the water level in the second water tank (42) and the float chamber (32a) of the housing (32) gradually descends when the second water tank (42) supplies boiled water out. The upper float (333) is maintained to be held against the step portion (34b) of the cover (34) by the magnetic attraction of the holding means while the lower float (334) moves downward in accordance with the water level in the float chamber (32a) and is at a level above the lower stop (336). The lower float (334) abuts on the lower stop (336) and is not supported by the buoyant force of water, thereby pushing the shaft (331) downward by the weight of the lower float (334) when the water level is below the predetermined level of the lower stop (334). Since the weight of the lower float (334) pushes the shaft (331) downward, the upper float (333) is caused to detach from the step portion (34b) of the cover (34). Thus, the valve block (332) is caused to move away from the valve seat (32c) so as to open the passage (310) while the shaft (331) moves downward. The water in the first water tank (41) is allowed to flow into the second water tank (42) again. The valve block (332) can be adjusted to abut tightly against the valve seat (32c) to close the passage (310) effectively by slightly adjusting the height of the upper stop (335) on the top end of the shaft (331).

The water level in the second water tank (42) can always be maintained at a controlled minimum level, which is above the heating element (43) in the second water tank (42), according to the predetermined level of the lower stop (336). The heating element (43) inside the second water tank (42) is always immersed in water, thereby eliminating the problem of overheating of the heating element (43). Thus, the heating element (43) is not easily damaged and has a long service life.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:

1. A control valve connected to a first water tank and a second water tank for controlling the water level of said second water tank, said control valve comprising:

a vertical housing having an upper end, a lower end, a float chamber adjacent to said upper end, a valve chamber adjacent to said lower end, a valve seat support provided between said valve chamber and said float chamber and defining a passage communicating said float chamber and said valve chamber, and a valve seat provided on a bottom portion of said valve seat support and immediately above said valve chamber;

an inlet conduit extending outwardly from said housing above said valve chamber, said inlet conduit having an inlet connected to said first water tank and an outlet adjacent to and communicated with said valve chamber;

an outlet conduit extending outwardly from said housing above said valve chamber and opposite to said inlet conduit, said outlet conduit having an inlet adjacent to and communicated with said passage and an outlet connected to said second water tank;

a controlling means for closing and opening said passage, including a shaft movable vertically and provided in said float chamber, said shaft having a top end extending adjacent to said upper end of said housing and a bottom end extending into said valve chamber passing through said passage, a valve block mounted on said bottom end of said shaft in order to abut against said valve seat so as to close said passage, an upper stop fixed on said shaft adjacent to said top end of said shaft, a lower stop fixed on said shaft between said upper stop and said bottom end of said shaft at a predetermined level, an upper float movably sleeved around said shaft between said upper stop and said lower stop in order to push said shaft upward when said upper float abuts on said upper stop so as to cause said valve block to abut against said valve seat, and a lower float movably sleeved around said shaft between said upper stop and said lower stop and below said upper float in order to push said shaft downward when said lower float abuts on said lower stop so as to move said valve block away from said valve seat;

means for limiting the downward movement of said upper float and the upward movement of said lower float, said limiting means being mounted on said housing between said upper float and said lower float; and a holding means mounted on said upper end of said housing, said holding means temporarily holding said upper float against said upper end of said housing in order to keep said valve block in a position which closes said passage when said upper float abuts on said upper stop and pushes said shaft upward, said holding means releasing said upper float away from said upper end of said housing when said lower float abuts on said lower stop and pushes said shaft downward;

whereby, the water level of said second tank can be always maintained at a controlled lowest level according to said predetermined level of said lower stop.

2. A control valve as claimed in claim 1, wherein said limiting means includes a perforated partition mounted inside said housing between said upper float and said lower float.

3. A control valve as claimed in claim 1, wherein said housing has a cover provided above said upper end of said housing.

4. A control valve as claimed in claim 3, wherein said holding means includes a metal member mounted on said upper float and a magnet member mounted on said cover of said housing.

5. A control valve as claimed in claim 1, wherein said lower end of said housing has a bottom cover adjacent to said valve chamber, said control valve further having a flexible sheet connected to said valve block and said bottom cover, said flexible sheet cooperating with said bottom cover to confine a volume variable air space in said valve chamber, said bottom cover being provided with a plurality of vents communicating said volume variable air space.

* * * * *